UNITED STATES PATENT OFFICE.

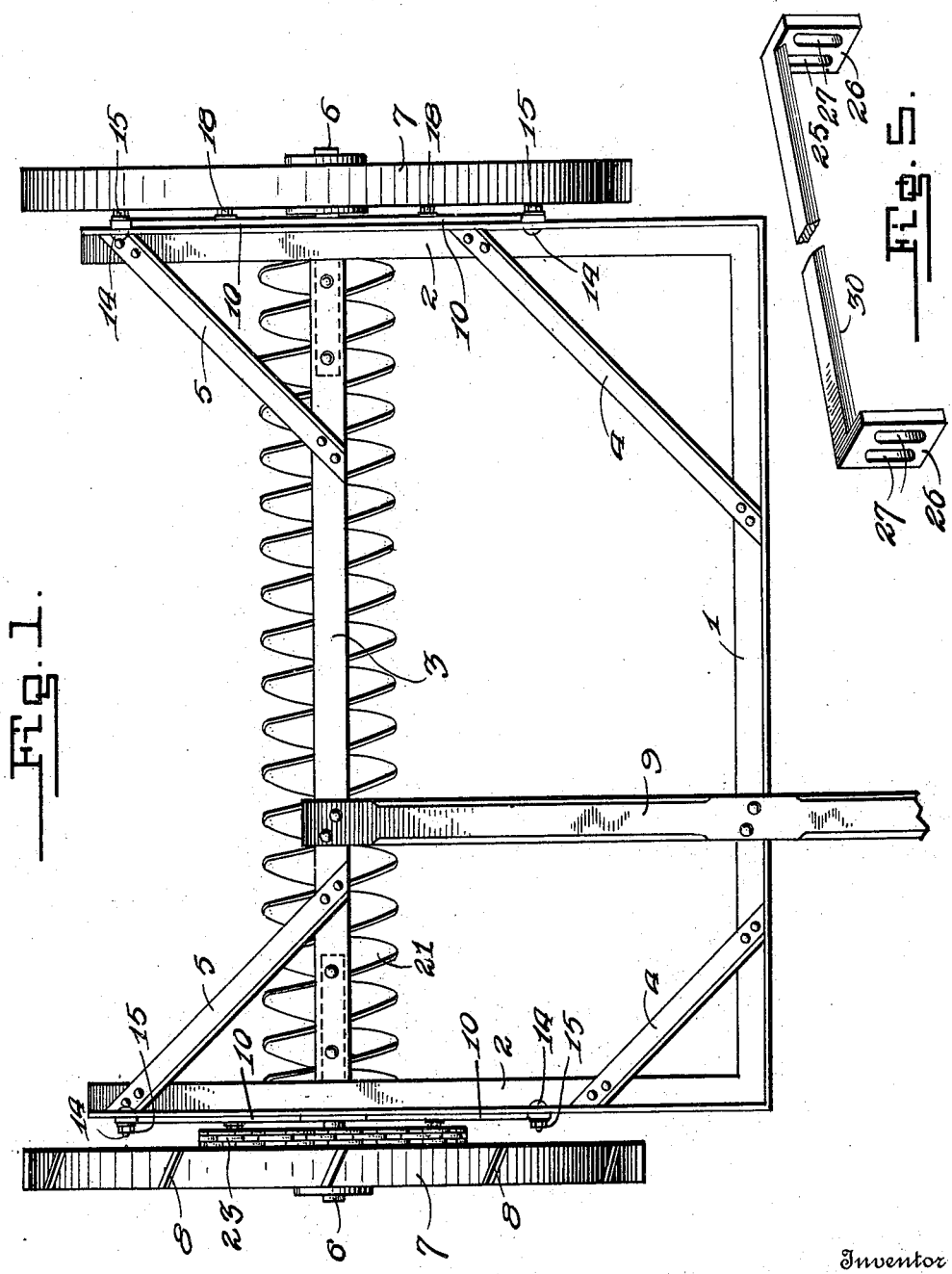

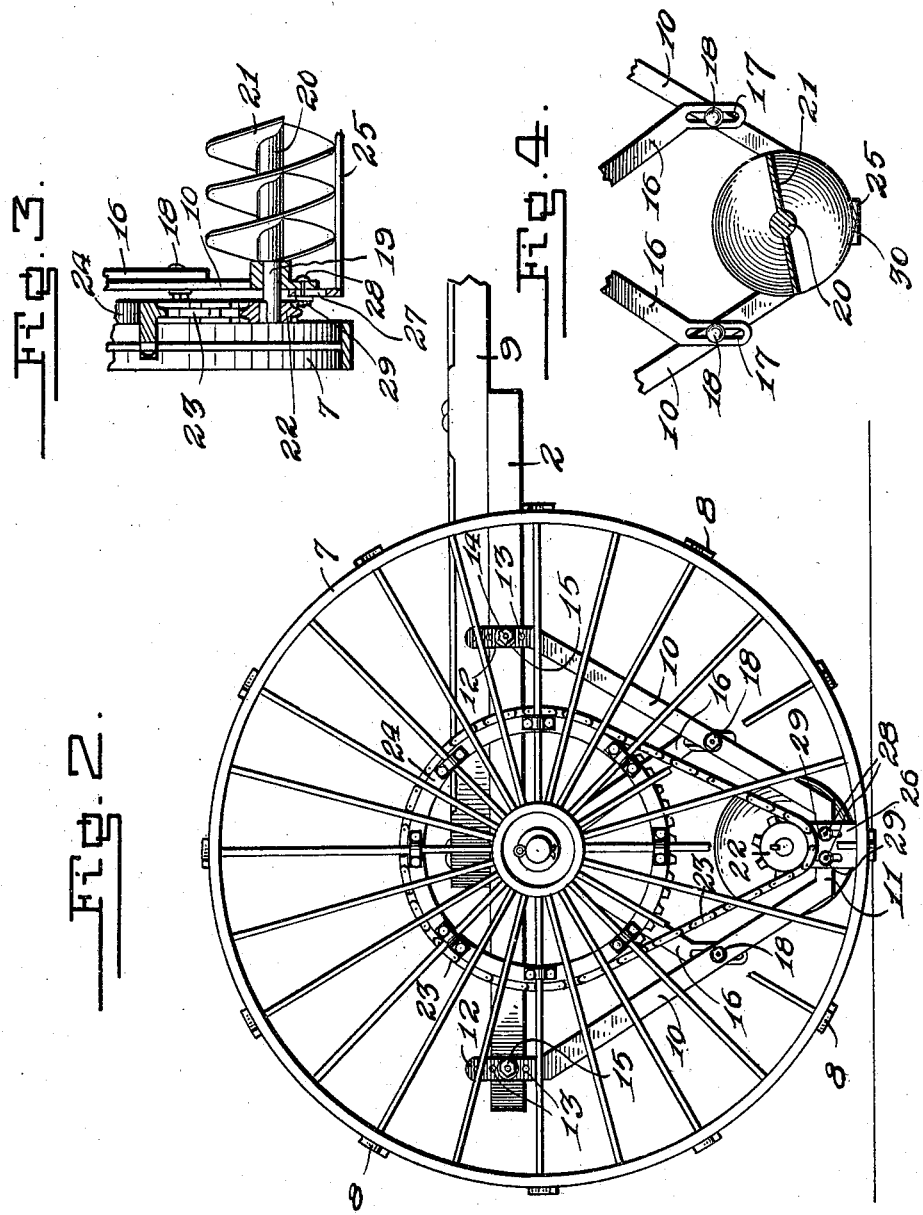

HENRY H. BRITTAN, OF WALLA WALLA, WASHINGTON.

WEEDING-MACHINE.

981,973.  Specification of Letters Patent.  Patented Jan. 17, 1911.

Application filed July 18, 1910. Serial No. 572,622.

*To all whom it may concern:*

Be it known that I, HENRY H. BRITTAN, a citizen of the United States of America, residing at Walla Walla, in the county of Walla Walla and State of Washington, have invented certain new and useful Improvements in Weeding-Machines, of which the following is a specification, reference being had therein to the accompanying drawing.

This invention relates to weeding machines, and has especial reference to that class of weeding machines in which a frame is mounted on wheels and cutters are suspended from said frame and extend across said frame adjacent to the ground.

The invention has for its object to provide an improved weeding machine of this kind, by means of which a swath of weeds is cut and left on top of the soil without loosening the soil.

The invention further has for its object to provide an improved weeding machine by means of which grass or weeds can be cut in a swath without loosening the soil to any great depth, but by means of which also the cutting apparatus may be adjusted against the ground so as to penetrate the surface thereof to a slight depth.

Referring to the accompanying drawings: Figure 1 is a plan view of a weeding machine constructed in accordance with this invention. Fig. 2 is a side view thereof. Fig. 3 is a detail view, partly in vertical section, showing a portion of one of the wheels and the cutting apparatus. Fig. 4 is a detail view showing a portion of the cutting apparatus in transverse section and the means for adjusting the same. Fig. 5 is a detail view in perspective of the cutter bars inverted and detached, and partly broken away.

In carrying out the invention, a suitable frame is provided, and as here shown, preferably consisting of a metallic frame formed with a transverse angle iron bar 1, side angle-iron bars 2, and a transverse metallic bar 3 secured in any suitable manner to the side bars 2. The frame is braced by means of diagonal angle-iron braces 4, connecting the front bar 1 with side bars 2, and with diagonal angle-iron braces 5, connecting the transverse bar 3 with the side bars 2. Each of the side bars 2 has secured thereto a spindle 6 on which is mounted a wheel 7, one of said wheels having its periphery provided with transverse projections 8 to engage the ground. The frame has secured thereto a pole 9 to which the team is hitched which draws the machine.

Suspended from the sides of the frame are diagonal bars 10 connected at their lower end by a cross bar 11 which is located at a slight distance above the ground, the whole forming a V-shaped frame. The bars 10 are each formed at their upper end with a vertical portion 12 provided with holes 13, through one of which projects a bolt 14 having on one end a nut 15, whereby the upper end of the bar 10 is secured to the frame. By removing the bolt 14, the V-shaped frame may be adjusted vertically by inserting the bolt in any one of the holes 13. Each of the V-shaped frames is braced by diagonal bars 16, each bar 16 having its lower end provided with a longitudinal slot 17, through which extends a set screw 18 screwing into the bar 10 and adapting the V-shaped frame to be lowered or raised by loosening the clamping set screws 18. The upper ends of the brace bars 16 are secured to the main frame. The lower end of each of the V-shaped frames is formed with a transverse hole through which extends a spindle 19 of a shaft 20 on which is mounted a screw or auger blade 21. One of the spindles 19 of the auger shaft projects beyond its bearing 11, and has mounted thereon a toothed pinion 22, over which extends a sprocket chain 23, which passes over a large driving sprocket wheel 24 secured to one of the wheels 7. By means of this sprocket wheel and chain connection the auger is rotated as the machine advances. Located beneath said auger and extending transversely across the machine from side to side thereof is a cutter bar 25, provided at its ends with vertical angular plates 26 which extend horizontally at an angle to the cutter bar 25 and are provided with vertical slots 27 through which extend bolts 28 secured by nuts 29, the bolts 28 projecting from the portion 11 of the V-shaped frame and the nuts 29 serving to clamp the end of plate 27 to the portion 11 of the V-shaped frame. By loosening the nuts 29 the plates 27 will be raised and lowered and clamped in position, thereby enabling the cutter bar 25 to be raised and lowered with reference to the surface of the ground. The cutter bar 25 is formed with a cutting edge 30 which extends transversely to and in contact with the edge 21 of the auger blade.

It will be seen that by means of a machine constructed and arranged as hereinbefore described that as the machine is drawn forward, the cutter bar, with its cutter blade will cut the grass or weeds, and that the auger as it revolves will force the grass or weeds into position to be cut by the cutter blade. If, for any reason, it is desired to go deeper into the soil, the auger and the cutter blade may be lowered by lowering the V-shaped frames and the plates 26 on the ends of the cutter blade. In the normal position of the auger and cutting blade, as shown in Fig. 3, as the machine advances, the auger revolves directly over and against the front edge of the blade, and thereby moves the grass or weeds into position to be cut by the blade. In this position of the blade the soil is not disturbed to a depth of more than half an inch from the surface.

This machine is specially useful in a country where it is advisable to keep the moisture near the top of the soil during the summer and fall months, since it cuts the weeds and leaves them on top of the soil without loosening it sufficiently to dry out.

Having described the invention, I claim:

1. In a weeding machine of the character described, a frame mounted upon wheels, a frame depending from each side of said main frame and vertically adjustable thereon, a revoluble auger having its ends mounted in said depending frames, and a cutter bar extending beneath and longitudinally of said auger and having its ends secured to and vertically adjustable on said depending frames.

2. In a weeding machine of the character described, a main frame mounted on wheels, a frame depending from each side of said main frame and vertically adjustable thereon, a revoluble auger having its ends mounted in said depending frame, a driving mechanism connecting said auger with one of the wheels, and a cutter bar having angle plates at its ends secured to and vertically adjustable on said depending frames, said cutter bar extending longitudinally of and beneath said auger and having its cutting edge adjacent to the edges of the convolutions of the auger blade.

3. In a weeding machine of the character described, a braced frame formed of angle irons mounted upon wheels, vertically adjustable V-shaped frames depending from each side of said main frame, diagonal brace bars suspended from said frame and adjustably connected to said V-shaped frames, a revoluble auger having its ends supported in said V-shaped frames and extending from side to side of the machine, a driving mechanism connecting said auger with one of the driving wheels, and a cutter bar having angular plates at its ends adjustably connected with said V-shaped frames, said cutter bar having its cutting edge extending beneath the auger and from end to end thereof.

In testimony whereof I hereunto affix my signature in presence of two witnesses.

HENRY H. BRITTAN.

Witnesses:
J. W. HILL,
O. M. WILKERSON.